Feb. 14, 1961 N. B. BRAYMER 2,972,067

MODULE INTERCONNECTIONS FOR A DATA HANDLING SYSTEM OR THE LIKE

Filed Oct. 29, 1958 2 Sheets-Sheet 1

INVENTOR
NOEL B. BRAYMER

BY HIS ATTORNEYS
HARRIS, KIECH, FOSTER & HARRIS

MODULE INTERCONNECTIONS FOR A DATA HANDLING SYSTEM OR THE LIKE

Filed Oct. 29, 1958 2 Sheets-Sheet 2

INVENTOR
NOEL B. BRAYMER

BY HIS ATTORNEYS
HARRIS, KIECH, FOSTER & HARRIS 2,972,067
Patented Feb. 14, 1961

2,972,067

MODULE INTERCONNECTIONS FOR A DATA HANDLING SYSTEM OR THE LIKE

Noel B. Braymer, Garden Grove, Calif., assignor to Beckman Instruments, Inc., a corporation of California Filed Oct. 29, 1958, Ser. No. 770,519
10 Claims. (Cl. 307—149)

This invention relates to circuitry for interconnecting components of complex electronic equipment, such as data handling systems and the like, where small D.C. analog signals are handled with accuracies in the order of 0.01 percent.

When assembling electrical components to form circuits or systems, it has generally been the practice to arrange the components in physically convenient locations and to interconnect the proper terminals by means of low impedance conductors. These interconnecting conductors may be routed directly from terminal to terminal or may be laid in a convenient path or may be assembled into cables which run from one area of the system to another. Connections to the common circuit ground may be made by running a conductor to the most convenient point on the chassis or by means of a ground buss which runs through the system and is connected to the chassis at one point. However, an electrical current must always flow in a closed loop and an electrical potential must exist between two points. The above conventional wiring techniques tend to ignore these two basic truths. With all potentials being measured to some absolute hypothetical ground and with terminals, such as ground, considered as sinks to and from which infinite amounts of current can flow, IR drops in the ground loops and crosstalk or interference generated by such connections adversely affect the accuracy of D.C. analog systems. Also, such a wiring system results in mutual inductances, capacitances and resistances which are connected into more than one unit of the system, resulting in further losses of accuracy. Accordingly, it is an object of the invention to provide circuitry for interconnecting components of a system in which ground loops and mutual impedances are eliminated and in which IR drops in conductors do not affect the system accuracy.

A complex electrical system of the type with which the invention is used may occupy a space in the order of 10 to 100 cubic feet. Such a system may comprise a combination of multiterminal modules which are functionally related to each other and which must be interconnected for carrying out the purposes of the system. However, there will be relatively few potentials which are significant to the system as distinguished from potentials existing within components such as amplifiers, converters, and the like. Hence, each module will have points between which one or more significant potentials appear. These module points must be intercoupled with points of other modules while the remaining circuitry of each module will be contained within that module and may be connected in the conventional manner. It is an object of the invention to provide circuitry for interconnecting the significant potentials of a plurality of modules which occupy a relatively large space while substantially eliminating conductive, electromagnetic, and electrostatic effects ordinarily associated with interconnections between spaced components. Of course, the invention is not limited to large modules and, in some circuit applications, a module may consist of a single component. A module may be an amplifier, a filter, an integrator, a resistor, a capacitor, etc. The system may be a complex data handling device, a computer, a plant controller or the like, or may be a relatively simple system comprising a power supply and amplifier.

It is an object of the invention to provide a module connection zone which is physically small relative to the modules in the system and to carry out all interconnections of significant potentials between modules at this zone. A further object is to provide a system wherein all the significant potentials are measured with respect to a terminal in this zone, which terminal is the circuit ground. A further object is to bring all significant potentials and all currents which must return to system ground to this zone by means of cables which comprise two or more conductors. Another object of the invention is to provide such cables, which may be twisted conductors or coaxial conductors, with electrostatic shields which are insulated from the remainder of the system except for a single connection to the circuit ground at the transfer zone. A further object of the invention is to provide such a system wherein the various components may be enclosed in electrostatic shields which are insulated from the remainder of the system and connected only to the circuit ground.

The determination of what potentials are significant will be dependent upon the particular application of the system, the accuracy required, the physical location of components, the interference likely to be encountered by the module, and similar factors. Hence, no fast rule can be laid down for defining the significant potentials. But once determined by analysis of the system, these significant potentials may be interconnected by the method of the invention to achieve the desired accuracy.

The objects of the invention are met by providing a single small piece of conductive material at some location in the system, which piece is referred to as the circuit ground or central mode. A plurality of terminals or peripheral nodes is provided adjacent the circuit ground and electrically isolated therefrom, these terminals being referred to as the transfer terminals. In a system where modules may be in the order of one cubic foot and the system in the order of 100 cubic feet, the circuit ground may be a block of copper ½ x 2 x 3 inches with the transfer terminals positioned around its periphery and spaced about one-eighth to one-quarter inch. The actual size of the circuit ground will depend upon the total number of conductors to be terminated there. The points between which each significant module potential appears are brought to the transfer zone from the remotely located module by a cable comprising two or more conductors, which conductors are terminated at one or more transfer terminals or ground as required. These conductors comprise the only connections between the modules. The conductors of a cable are preferably twisted or otherwise arranged to balance electromagnetically induced voltages. The very close proximity of the transfer terminals to each other and to the circuit ground substantially eliminates errors induced by electromagnetic pickup. All potentials and currents are brought to the transfer zone in cables consisting of two or more conductors with the net current in each cable being zero.

The significant parameters of the system are not absolute potentials, but potentials between either a transfer terminal and ground or between two transfer terminals. The potential between two points can be transmitted for a considerable distance by a pair of conductors. The absolute potential at the other end of a conductor connected to circuit ground may depart by a significant amount from the ground potential; however, the potential between that conductor and the corresponding end of a second conductor in the cable will represent the potential between the other ends of the conductors which are connected to the ground and/or transfer terminals.

While a module may be physically remote from the transfer therefor and may have points physically positioned on the module for interconnection with points of other modules, the actual terminals of the module for system electrical purposes are the transfer terminal ends of the conductors which serve to connect the physical points on the chassis to the transfer terminals and circuit ground. Hence, every terminal of a module at which a significant potential exists will be common to a terminal of some other module with zero length of conductor therebetween, although the major portions (i.e., all except the cables) of the modules are remote from the transfer terminals. It should be noted that according to the invention, two contiguous modules will be interconnected only at their terminals, i.e., at the transfer terminals, which may be many feet distant.

Each of the cables used for connecting the modules to the transfer zone may be enclosed in a conducting shield to eliminate electrostatic pickup. The conducting shield is connected only to the circuit ground at a single point and the shield is electrically isolated from the remainder of the system. Also, it is preferred to electrostatically shield each of the components or modules, which shield is isolated conductively from the remainder of the system and connected only to the circuit ground.

The circuitry of the invention provides for interconnecting components of a large and complex electrical system for handling small analog signals and substantially eliminating the errors introduced by conventional wiring techniques, permitting accuracies of data handling and the like to a degree never before accomplished.

The method of the invention for interconnecting modules permits interconnection of a system to achieve minimum interference without resort to trial and error wiring. The interconnection system of the invention requires leads that are extremely long in comparison to conventional systems and will use many times the amount of hookup wire used in a conventional wiring arrangement. However, this apparently excessive use of wire provides module interconnections with signal leads having virtually zero strength.

Specific embodiments of the invention are shown in the drawings and described below as illustrative of the manner of practicing the invention.

In the practice of the invention, the terminals of the modules which are to be interconnected are concentrated in a space that is extremely small in comparison to the space occupied by the remainder of the modules, and the leads from the terminal space to the remainder of each module are combined into cables with the sum total of the currents in a cable equal to zero.

Figure 1:
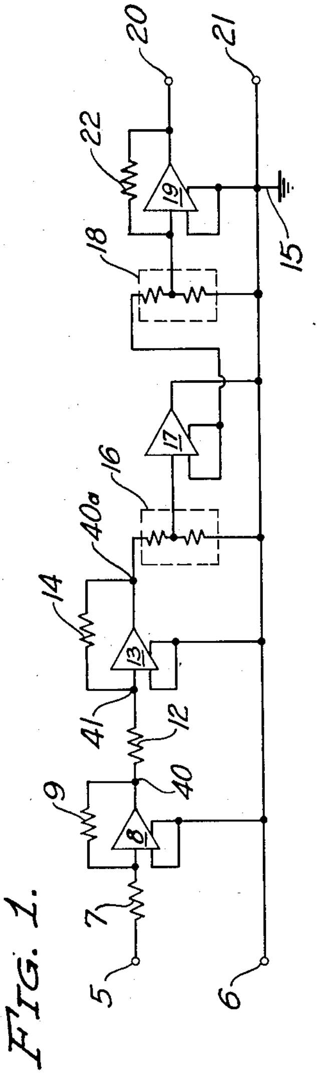
Fig. 1 is a schematic diagram of a portion of a conventional data handling system.

The circuit of Fig. 1 includes input terminals 5 and 6 with terminal 5 connected through an input resistor 7 to an amplifier 8. The input terminal 6 is connected to the ground side of the amplifier 8 and to circuit ground, as indicated at 15. A feedback resistor 9 is connected across the input and output of the amplifier 8 to provide an operational type of amplification circuit. The output of the amplifier 8 is connected through an input resistor 12 to an amplifier 13, which is also connected as an operational type with a feedback resistor 14. The output of the amplifier 13 is connected as the input to a digital-to-analog converter 16 and the output of the converter is connected as an input to another amplifier 17. A digital-to-analog converter is essentially a digitally controlled voltage divider and may be represented as a three-terminal component comprising two resistors connected in series, although an actual converter may be a quite complex piece of circuitry. The amplifier 17 is operated as a potentiometric amplifier with its output connected to circuit ground and the ground side of the amplifier connected as an input to another digital-to-analog converter 18. The converter output is connected to another amplifier 19, with the output of this amplifier being developed at output terminals 20, 21. A feedback resistor 22 is connected across the output and input of the amplifier 19 such that the amplifier functions as an operational amplifier. The particular application of the circuit of Fig. 1 in a system is not pertinent to the invention, this arrangement of components having been selected to serve as an illustration of the manner in which the invention is applied to a plurality of functionally associated units.

Figure 2:
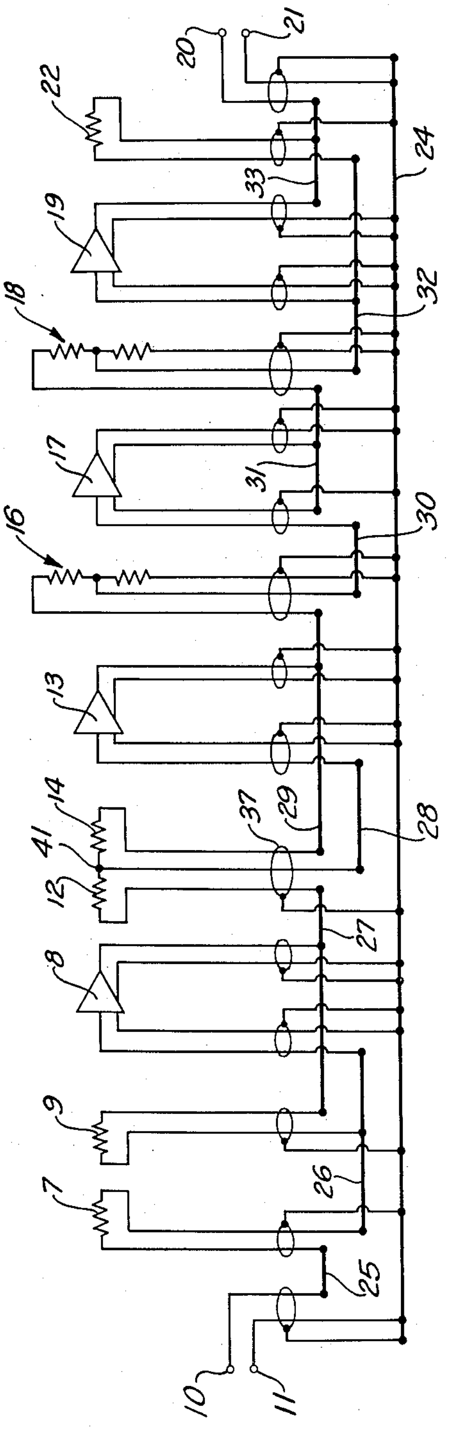
Fig. 2 is a diagram showing the interconnections of the components of Fig. 1 according to the teachings of the invention.

While each amplifier may comprise a plurality of stages with a plurality of feedback loops and the like, each will have only two potentials which are significant to the system, namely, the potential developed across the two input terminals and the potential developed across the two output terminals. Hence, in the diagram of Fig. 2, each amplifier is represented as a module having two two-terminal sets. Each of the converters 16, 18, is a module with a three-terminal set, as shown in Fig. 2. The input terminals 10, 11 are shown as a two-terminal set as are the output terminals 20, 21. The gain determining resistors 12, 14 associated with the amplifier 13, are considered a separate module and are shown as a three-terminal set. The features and advantages of this arrangement of the gain resistors will be discussed in detail below. Each of the resistors 7, 9 associated with the amplifier 8 is treated as a separate module comprising a two-terminal set. It should be noted that the simple resistors of the schematic may actually be servo driven variable resistors or digitally actuated, relay selected resistor banks, or other complex equipment. The feedback resistor 22 associated with the amplifier 19 is shown as a separate module comprising a two-terminal set. It should be kept in mind that in an average system in which the invention is utilized, there will be in excess of fifty such modules which require interconnection of their significant potentials.

In the diagram of Fig. 2, the heavy line 24 represents the circuit ground. The circuit ground consists of a small piece of conducting material, such as a block of copper having means for attaching a plurality of conductors thereto. The block is made as small as possible concomitant with the requirement for termination of conductors thereto. A typical size block for a small system is in the order of ½ x 2 x 3 inches. In contrast, in a larger system occupying a space about six by three by twelve feet, in excess of one thousand circuit ground connections are made to a block about ½ x 12 x 12 inches. Each of the heavy lines 25 through 33 represents a transfer terminal. Each transfer terminal provides means for conductively connecting two or more conductors. Each transfer terminal is positioned as close as practicable to the circuit ground 24, ordinarily in the order of one-eighth to one-quarter inch, and is electrically isolated therefrom.

Instead of the conventional interconnection of modules by the direct running of conductors therebetween, all of the module points to be interconnected are carried to the transfer zone formed by the circuit ground 24 and transfer terminals 25–33, by means of cables. Each cable consists of two or more conductors running from the module to the transfer zone. It should be kept in mind that these long cables are electrically part of the respective modules, the modules terminals being at the transfer terminals 25–33 and the block 24. The conductors are preferably twisted to minimize electromagnetic pickup.

Alternatively, coaxial conductors may be used. Each cable is preferably enclosed in an electrostatic shield, such as a conducting braid, with the shield being connected only to the circuit ground 24. A shield is indicated in the drawings by a loop, such as the loop 37 around the three conductors which form the cable connecting the gain control resistors 12, 14 to the transfer terminals 27, 28 and 29. Since each shield is connected only to the circuit ground, the shields must be electrically isolated from the other shields, the modules, the rack or frame in which the system is built, and any other conducting elements, preferably being accomplished by providing an insulating jacket over the shield. Also, each of the modules is preferably enclosed in an electrostatic shield which is connected only to the circuit ground 24 and is electrically isolated from the remainder of the system.

Thus by wiring the modules as shown in Fig. 2, the interconnection of the modules is accomplished substantially at a point, thereby eliminating the effects due to ground loops, net currents in cables, IR drops, and electromagnetic and electrostatic pickup.

Figures 3, 4:
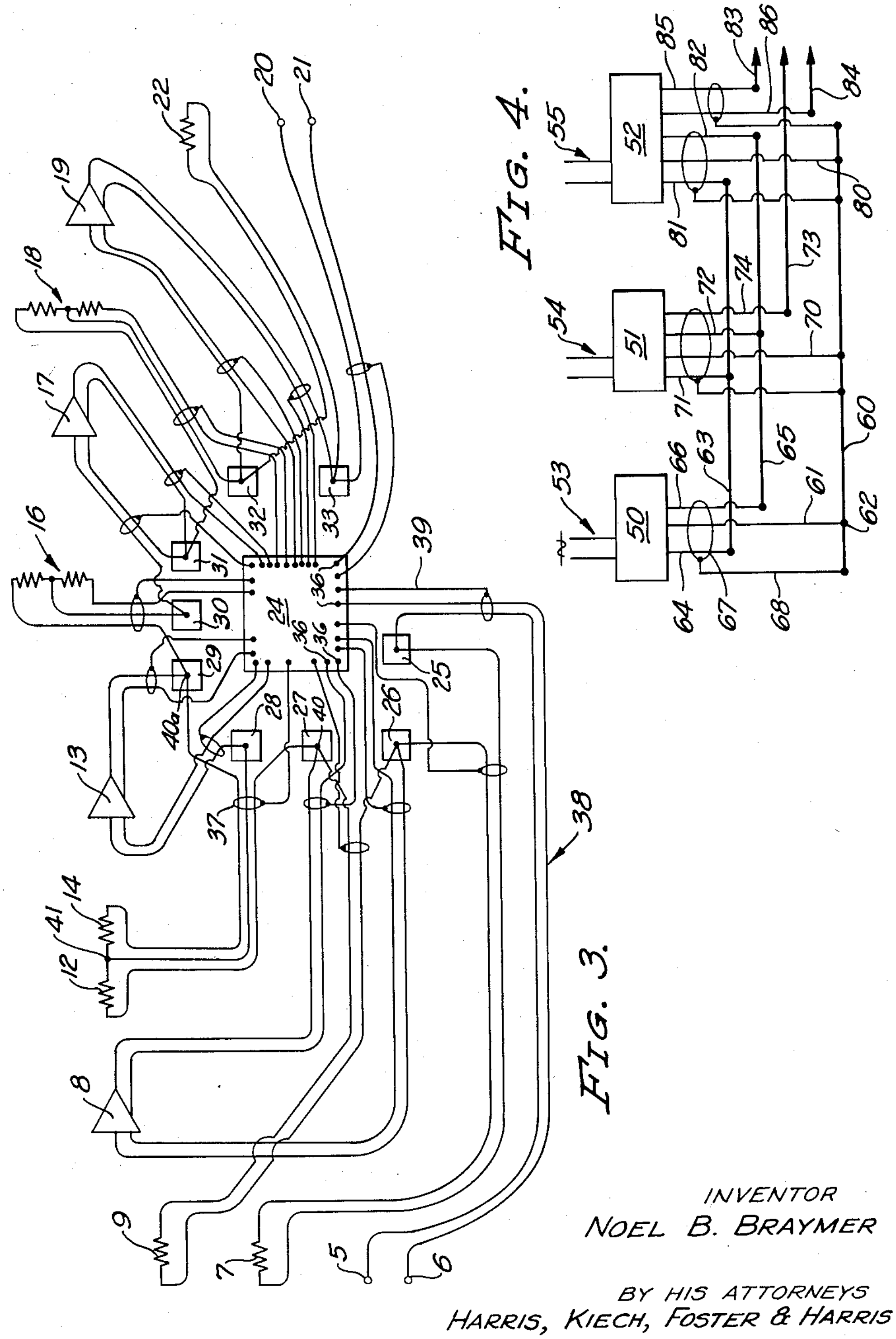
Fig. 3 is a connection diagram for a portion of the circuit of Fig. 2.
Fig. 4 is a diagram similar to that of Fig. 2 for another type of circuit.

A connection diagram for the circuit of Fig. 2 is shown in Fig. 3 for the purpose of illustrating the physical arrangement of the components. It should be kept in mind that while the input terminals and some of the resistors may be physically small and compactly arranged, the amplifiers and the converters may require space in the order of a cubic foot. Hence, when a number of such modules are to be interconnected, the distances between some modules of the system will be in the order of several feet. The centrally located rectangle of Fig. 3 represents the circut ground 24 having a plurality of terminals 36 thereon. The peripherally disposed squares represent the transfer terminals 25–33 which in actual practice may be closer to the circuit ground than shown in the drawing. A cable 38 from the input terminals 5, 6 is terminated adjacent the transfer terminal 25 with one conductor connecting input terminal 5 to the transfer terminal 25 and the other conductor connecting input terminal 6 to a terminal 36 of the circuit ground 24. The shield on the cable 38 is also connected to the circuit ground by a conductor 39. The other modules are similarly connected by cables in the same manner pursuant to the diagram of Fig. 2.

In a system having a large number of amplifiers, the amplifiers will generally be grouped together, and the input and feedback resistors grouped together in a different location. The wiring of such a system following the teachings of the invention will not resemble conventional wiring at all, nor would it to someone not familiar with the teachings of the invention, appear to have accomplished its purpose.

Conventional wiring attempts to keep all connections as short as possible. Contrary to this, connections made according to the invention appear to be quite excessively long, particularly in a large system. This appearance is deceptive, however, because the long conductors are not the interconnections at all. The long conductors are merely extensions of the packages comprising the modules of the system, while all interconnections are made in the vicinity of the transfer terminals.

Consider now the operational amplifying circuit comprising the amplifier 13 and resistors 12, 14. Using conventional wiring, the resistors would be built into the amplifier and the unit would comprise a two-terminal input set and a two-terminal output set. However, there are three potentials in this operational amplifying unit which are significant to the system, namely the input potential between point 40 and ground, the output potential between point 40a and ground, and the summing node potential between the summing node 41 and ground. In the interconnection circuitry of the invention, the input terminals, the gain control resistors, and the amplifier proper are treated as separate modules with the input potential appearing between the transfer terminal 27 and the circuit ground 24, the output potential between transfer terminal 29 and circuit ground, and the summing node potential between transfer terminal 28 and circuit ground. The modules themselves are connected to the transfer terminals by cables with each cable having zero net current therein although there is current between the modules.

For example, the conductor between transfer terminal 28 and the input of the amplifier 13 will necessarily carry a small current. However, there will be a similar current in the other conductor in the cable which connects the circuit ground to the other input terminal of the amplifier 13, resulting in zero net current in the cable. Similarly, there will be a current in the conductor from the output terminal of the amplifier 13 to the transfer terminal 29. A similar current will also be carried in the conductor between the amplifier output and the circuit ground. Likewise, equal currents will exist in the conductors which connect the feedback resistor 14 to the transfer terminals 28 and 29. This separation of the input terminal pair from the output terminal pair of the amplifier and the further separation of the gain control resistors from the amplifier result in no net currents in the module interconnecting conductors and, hence, eliminates a source of error. Furthermore, the IR drop in the amplifier output cable is now inserted in the feedback loop so that it is compensated for and, hence, becomes nonsignificant.

The application of the invention to a system utilizing a power supply 50 and two amplifiers 51, 52 is shown in Fig. 4. An A.C. voltage is connected to the power supply 50 via leads 53 and input signals are connected to the amplifiers 51, 52 by means of leads 54, 55, respectively.

The power supply common is connected to circuit ground 60 by a conductor 61 at terminal 62. The power supply may have positive and negative voltage outputs connected to a transfer terminal 63 by a lead 64 and a transfer terminal 65 by a lead 66, respectively. The net current through the leads 61, 64 and 66 is zero and these three conductors are cabled together for running from the power supply to the transfer terminals and ground block. The conductors are preferably twisted and enclosed in a shield 67, the shield being connected to the circuit ground 60 by another conductor 68. The diagram of Fig. 4 corresponds to the diagram of Fig. 2, but it should be noted that the physical arrangement of the components will be similar to that of Fig. 3.

The circuit ground 60 and the transfer terminals 63, 65 are connected to the amplifier 51 by leads 70, 71 and 72, respectively. There is a connection within the amplifier 51 between the power supply common and signal ground so that the output from the amplifier 51 appears between transfer terminal 73 and ground 60 with the amplifier being connected to the transfer terminal 73 by a lead 74. The four conductors 70, 71, 72 and 74 are cabled together to provide a cable having zero net current therein.

The power source is connected to the amplifier 52 by leads 80, 81 and 82. The output from the amplifier 52 is connected to transfer terminals 83, 84 by leads 85, 86, there being no connection within the amplifier between power supply common and the output. For this amplifier, the conductors 80, 81 and 82 are cabled together and the conductors 83 and 84 are cabled together to provide cables having zero net current.

As in the embodiment of Figs. 1, 2 and 3, the ground block 60 and the transfer terminals 63, 65, 73, 83 and 84 are made as small as possible and are positioned as close together as possible, whereas the power supply 50 and the amplifiers 51 and 52 may be relatively large and positioned at remote locations. The three modules of the circuit of Fig. 4 may comprise the entire system or they may merely be a small portion of a much larger system to which the interconnection method of the invention is applied.

Thus, it is seen that the circuitry of the invention for interconnecting components of complex electrical equipment wherein all grounds are returned to a system ground comprising a piece of conducting material which is physically small relative to the components of the system and in which all significant potentials are measured relative to this system ground and are transferred only at transfer terminals physically close to the system ground provides the desired minimization of signal errors ordinarily due to the maze of wiring required for such large systems. The invention is suitable for use with all types of systems handling signals of frequencies from D.C. up to the point at which transmission line effects become significant.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a circuit for interconnecting a plurality of modules of a system, which modules have points between which potential values appear that are significant to the system output, the combination of: a system ground comprising a piece of conducting material that is small relative to the size of the modules; a plurality of transfer terminals, with each of said transfer terminals being positioned adjacent and electrically isolated from said ground; and a plurality of cables, each of said cables comprising a portion of a module and including leads for connecting said module points to said transfer terminals and ground, with module points that are to be intercoupled being connected to the same transfer terminals, such that the only common connections between modules are at said transfer terminals and ground.

2. In a circuit for interconnecting a plurality of modules of a system, which modules have points between which potential values appear that are significant to the system output, the combination of: a system ground comprising a piece of conducting material that is small relative to the size of the modules; a plurality of transfer terminals, with each of said transfer terminals being positioned adjacent and electrically isolated from said ground; and a plurality of cables, each of said cables comprising a portion of a module and including leads for connecting said module points to said transfer terminals and ground, with module points that are to be intercoupled being connected to the same transfer terminals, such that the only common connections between modules are at said transfer terminals and ground, with each of said cables comprising at least two conductors enclosed in a conducting shield, which shield is connected to said ground and insulated from the remainder of the system.

3. In a circuit for interconnecting a plurality of modules of a system occupying a space having a minimum dimension of a foot, which modules have points between which potential values appear that are significant to the system output, the combination of: a system ground comprising a block of conducting material having a maximum dimension of a few inches; a plurality of transfer terminals, with each of said transfer terminals being electrically isolated and spaced only fractions of an inch from said ground; and a plurality of cables, each of said cables comprising a portion of a module and including leads for connecting said module points to said transfer terminals and ground, with module points that are to be intercoupled being connected to the same transfer terminal, such that the only common connections between modules are at said transfer terminals and ground, with each of said cables comprising at least two conductors twisted and having a zero net current.

4. In a grounding circuit for a data handling system or the like having a plurality of modules having points between which potential values appear that are significant to the system, the combination of: means for electrically insulating each of the modules from the remainder of the system; a single system ground terminal; a plurality of transfer terminals positioned adjacent said ground terminal; and a cable comprising a portion of a module and including leads for connecting said module points to said transfer and ground terminals, with module points that are to be intercoupled being connected to the same transfer terminals, with the net current in said conductors being zero.

5. In a grounding circuit for a data handling system or the like having a plurality of modules having points between which potential values appear that are significant to the system, the combination of: means for electrically insulating each of the modules from the remainder of the system; a single system ground terminal; a plurality of transfer terminals positioned adjacent said ground terminal; a cable comprising a portion of a module and including leads for connecting said module points to said transfer and ground terminals, with module points that are to be intercoupled being connected to the same transfer terminals; an electrostatic shield positioned around each of said cables, with each of said shields electrically insulated from the remainder of the system; and means for connecting each of said shields to said ground terminal.

6. In a system for analog operations on an electrical signal, the combination of: a plurality of modules comprising functionally associated component assemblies, with said modules distributed in a space which is at least one order of magnitude larger than the space confining one module, said modules having sets of signal carrying terminals; a plurality of peripheral nodes, each comprising a conductive junction of at least two signal carrying conductors; and one only central node comprising a conductive body for forming a junction between at least two signal carrying conductors, with each conductor connecting a node and a signal carrying terminal of a module, and with said peripheral nodes located adjacent said central node and conductively isolated therefrom, and with said peripheral and central nodes confined in a space of the same order of magnitude as any of said modules, and with said signal carrying conductors between said modules and said nodes providing all signal carrying connections between said modules, and with the signal carrying conductors to each of said sets of terminals formed into a separate cable.

7. In an operational amplifier circuit, the combination of: an amplifier unit having a two-terminal input and a two-terminal output; an input resistor and a feedback resistor serially connected at a summing node, providing a three-terminal unit; a circuit ground terminal; first, second and third transfer terminals, with each of said transfer terminals positioned relatively close to and electrically isolated from said ground terminal forming a transfer zone positioned relatively remote from said units; a three-conductor cable for connecting said three-terminal unit to said transfer terminals, with said input resistor across the first and second transfer terminals and said feedback resistor across the second and third transfer terminals; a first two-conductor cable for connecting said input terminals of said amplifier unit to said second transfer terminal and said ground terminal respectively; and a second two-conductor cable for connecting said output terminals of said amplifier unit to said third transfer terminal and said ground terminal respectively.

8. A system comprising a plurality of modules that cooperate electrically, each of said modules having a plurality of terminals with each of said terminals common to at least one terminal of another of said modules, and with said common terminals located in a space that is small with respect to the space occupied by the remainder of the modules, each of said modules including conductive leads extending between the remainder of each said module and the terminals thereof, with said conductive leads grouped together in cables for substantially their entire length with the net current in each of said cables in the operation of the system being zero.

9. A plurality of modules that form an electronic system, each of said modules having a plurality of terminals, each of said modules including conductive leads connected between each terminal thereof and the remainder of the module remote from said terminals, with each terminal of a module also being a terminal of at least one other module of said system, whereby in the operation of the system current is flowing in said conductive leads, with all of said terminals grouped together in a space that is small with respect to the space occupied by said remainders of said modules, said conductive leads being grouped and twisted together over substantially their entire length to form cables so that the net current in each cable is zero, with said conductive leads being separate and not twisted only adjacent said terminals and said remainders.

10. In combination: a system ground comprising a piece of conducting material; a plurality of modules of a system, which modules have points between which potential values that are significant to the system output, with said modules arranged in said system to be at varying distances from said ground; a plurality of transfer terminals, with each of said transfer terminals being positioned immediately adjacent and electrically isolated from said ground; and a plurality of cables, each of said cables comprising a portion of a module and including leads for connecting said module points to said transfer terminals and ground, with the length of said cables being at least several times any linear dimension of said ground, and with module points that are to be intercoupled being connected to the same transfer terminals, such that the only common connections between modules are at said transfer terminals and ground.

References Cited in the file of this patent

UNITED STATES PATENTS 2,268,619 Reid ------------------ Jan. 6, 1942

UNITED STATES PATENT OFFICE

CERTIFICATE OF CORRECTION

Patent No. 2,972,067 February 14, 1961

Noel B. Braymer

It is hereby certified that error appears in the above numbered patent requiring correction and that the said Letters Patent should read as corrected below.

Column 3, line 4, for "therefor" read -- terminals --; line 43, for "strength" read -- length --; column 5, line 32, for "circut" read -- circuit --.

Signed and sealed this 17th day of October 1961.

(SEAL)
Attest:

ERNEST W. SWIDER
Attesting Officer

DAVID L. LADD
Commissioner of Patents

USCOMM-DC